June 26, 1934. J. RAZEK ET AL 1,964,365
METHOD OF AND APPARATUS FOR DETERMINING THE INTENSITY OF COLORS
Filed Jan. 8, 1931 4 Sheets-Sheet 1

June 26, 1934.  J. RAZEK ET AL  1,964,365
METHOD OF AND APPARATUS FOR DETERMINING THE INTENSITY OF COLORS
Filed Jan. 8, 1931   4 Sheets-Sheet 2

Inventors
Joseph Razek
Peter J. Mulder,

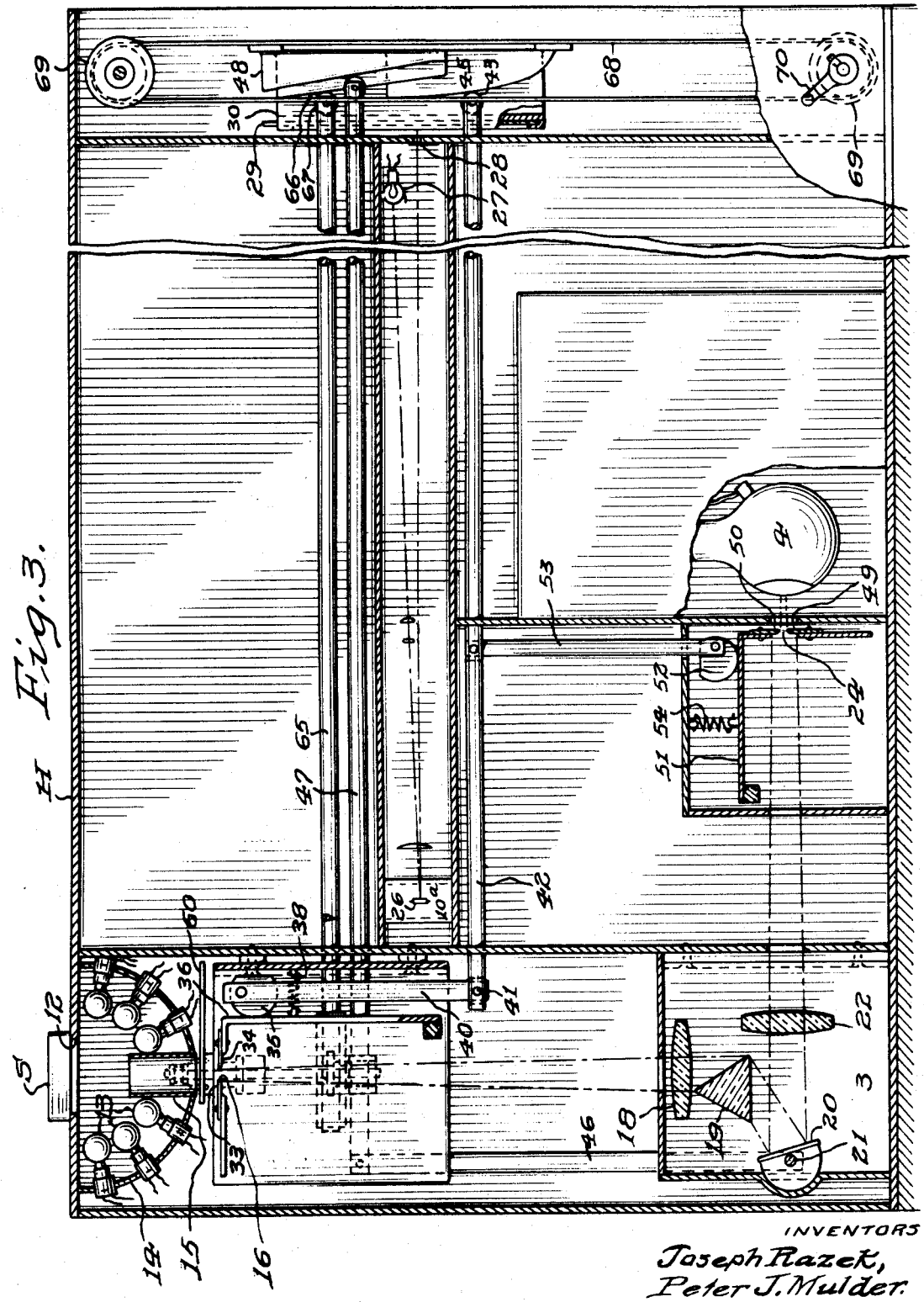

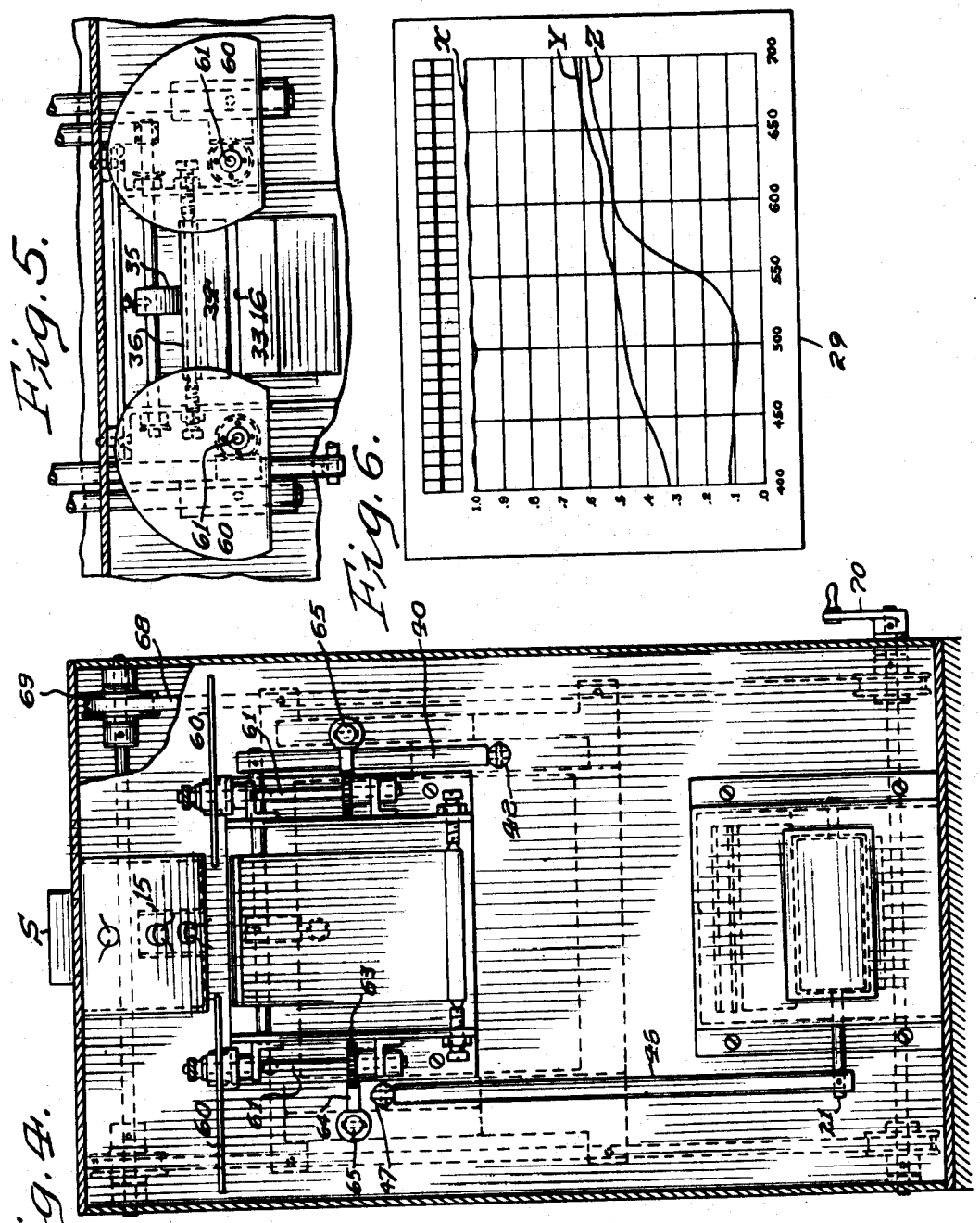

Patented June 26, 1934

1,964,365

UNITED STATES PATENT OFFICE 1,964,365

METHOD OF AND APPARATUS FOR DETERMINING THE INTENSITY OF COLORS

Joseph Razek, Upper Darby, and Peter J. Mulder, Drexel Hill, Pa.

Application January 8, 1931, Serial No. 507,448

27 Claims. (Cl. 88—14)

This invention relates to a method of and an apparatus for determining the intensity of colors emitted from any light source, such as reflected light, transmitted light or a primary light. It is primarily designed to enable accurate determination to be made of the percentage of white light from a colored, opaque, or transparent body. The extremely high sensitivity of the apparatus, called a color analyzer or photoelectric spectro-photometer, coupled with its substantially uniform stability, rapidity of action and other desirable characteristics, makes it possible to obtain measurements not heretofore obtainable and also of a greater accuracy than have heretofore been obtainable. This application is in part a continuation of Serial No. 498,296, filed November 26, 1930, which is a division of Serial No. 328,835, filed December 27, 1928.

Figure 1:
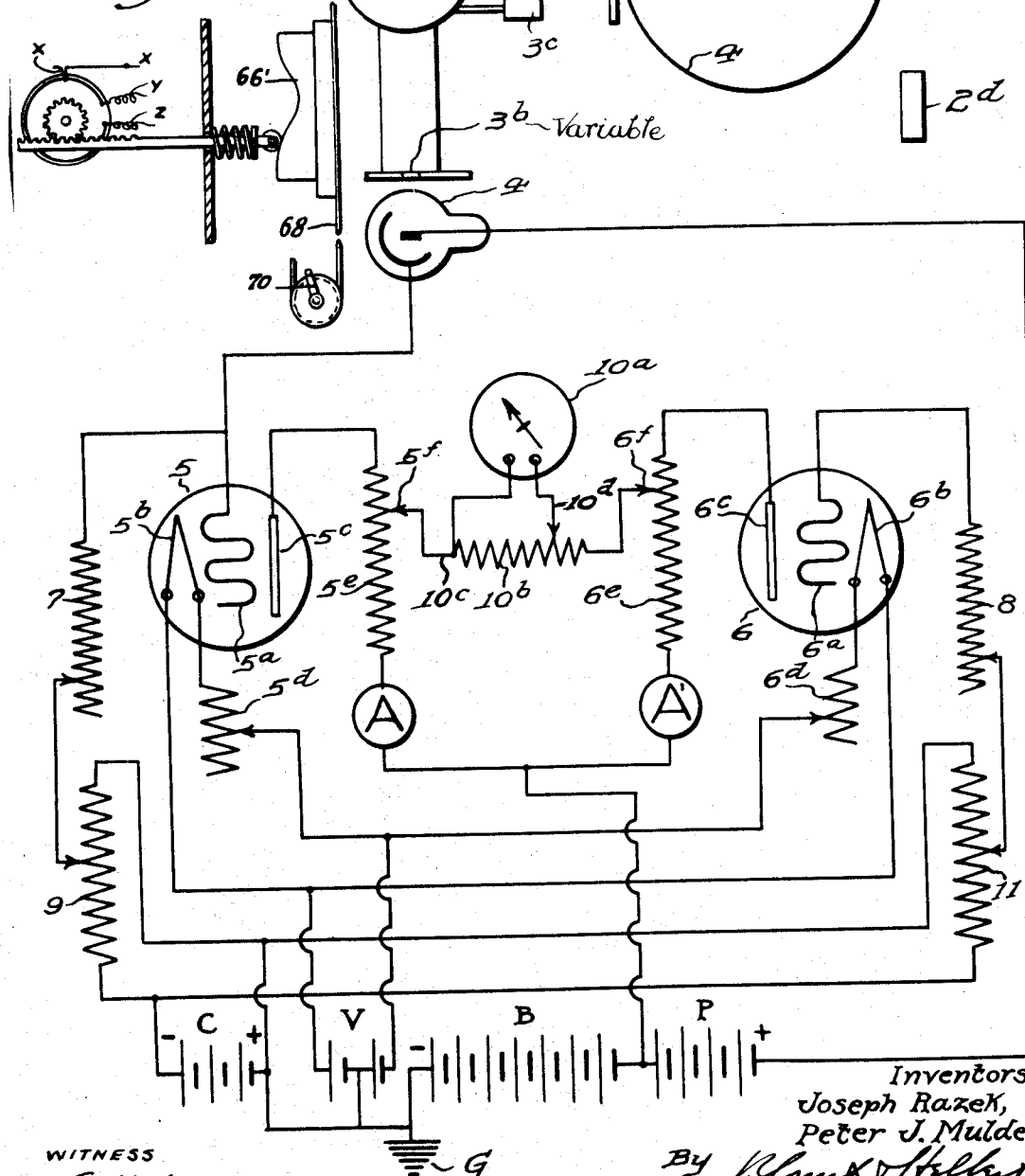
Figure 2:
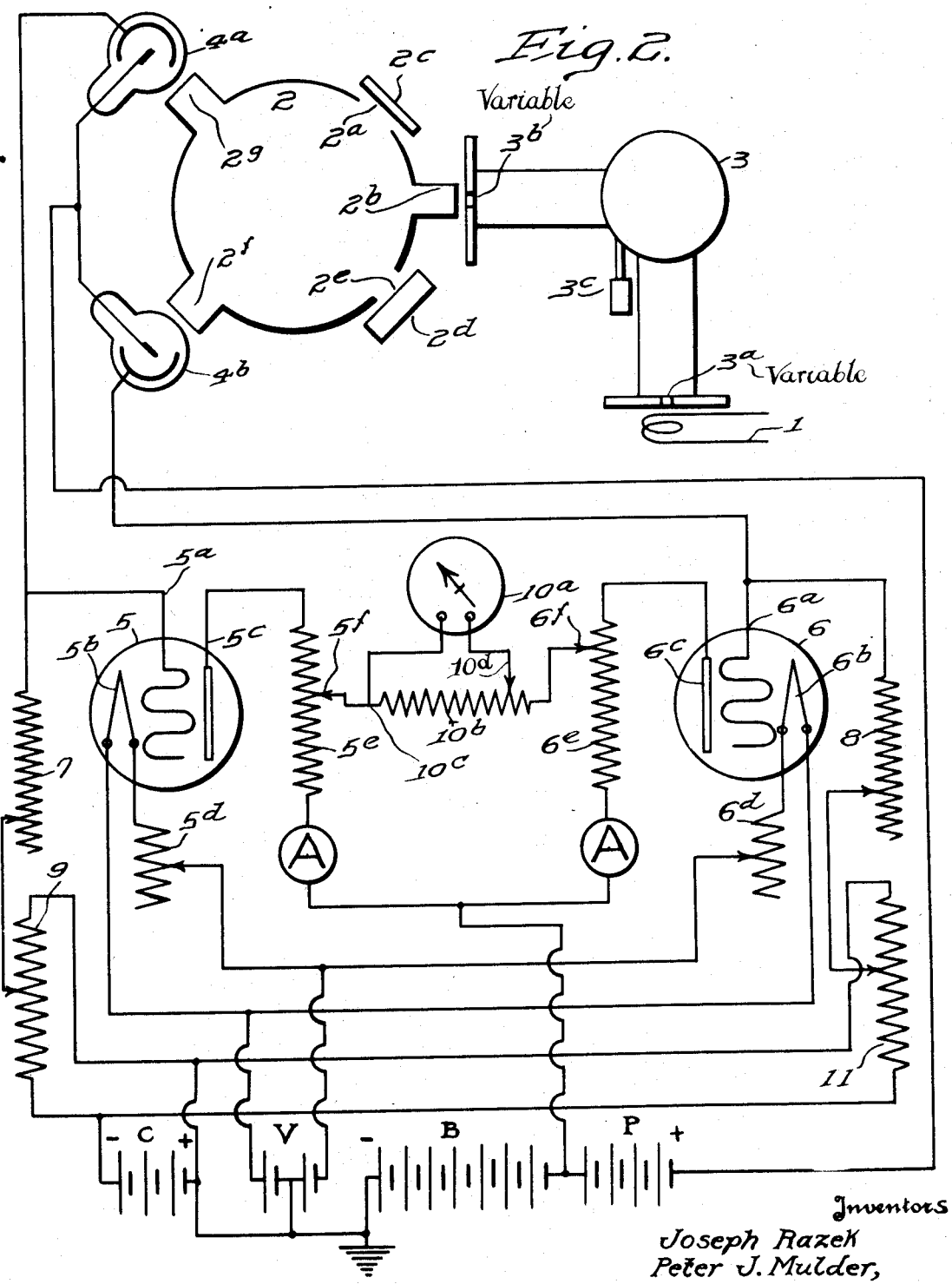

In the accompanying drawings Fig. 1 is a diagrammatic view of one embodiment of our invention and Fig. 2 is a similar view of a modification of the embodiment shown in Fig. 1. Fig. 3 is a somewhat diagrammatic longitudinal vertical section showing our invention as embodied in an apparatus designed for automatic operation and Fig. 4 is a transverse vertical section thereof; Fig. 5 is a detail view of the means for varying one of the spectrometer slits through which the light to be examined is directed, the parts being shown in fragmentary top plan view; Fig. 6 shows examples of typical reflection factor curves produced by our improved instrument. Fig. 7 is a detail view of an arrangement for adjusting a compensating resistance. Like reference characters refer to like parts in the drawings.

Referring now more particularly to Fig. 1, a source of light 1, such as, for example, a high power arc or lamp, is adapted to transmit light to an Ulbricht sphere 2 or other light diffusing means, which is provided with apertures $2^a$ and $2^b$ positioned diametrically opposite. The specimen body to be examined is shown at $2^c$ and a body having a standard white surface, such as magnesium carbonate, shown at $2^d$. Adjacent the aperture $2^b$ is positioned the collimator slit $3^a$ of a constant deviation spectrometer 3. Adjacent the slit $3^b$ of the spectrometer 3 is positioned a photoelectric cell 4. The slits $3^a$ and $3^b$ are variable in size, either in length or width or both.

One electrode of the photoelectric cell 4, preferably the coating, is connected to the audion amplifying circuit at the grid $5^a$ of the audion 5 which also comprises the plate or anode $5^c$ and the electron emitting body or hot filament $5^b$. This filament is heated by current from a battery V, the magnitude of the filament current being adjustable by the variable resistance $5^d$. In series with the anode $5^c$ is the resistance $5^e$, a portion of which is adapted to be tapped by a variable contact $5^f$. The ammeter A and the anode battery B complete the plate circuit. To the grid $5^a$ is connected a variable high resistance 7 which in turn is connected to a potential divider 9 whereby any portion of the voltage of the battery C may be applied to the grid circuit.

This high resistance is especially adapted to the audion to produce extremely high sensitivity, preferably of the order of magnitude of 1000 to 2000 megohms, although resistances of from 500 to 10000 megohms may be used. The value of a resistance used with a particular audion is determined by the physical constants of the audion according to methods developed by us (Journal of Optical Society and Review of Scientific Instruments, vol. 18, No. 6 June 1929). Such a high resistance may be made satisfactorily by sealing a liquid or mixture of liquids having a suitable low value of conductivity in a glass container between electrodes. One suitable liquid is a mixture in proper proportions of ethyl alcohol and xylol.

An audion 6 and associated connections $6^a$, $6^b$, $6^c$, $6^d$, $6^e$, $6^f$, 8 and 11 similar in construction and operation to the analogous parts $5^a$, $5^b$, $5^c$, $5^d$, $5^e$, $5^f$, 7 and 9, respectively, associated with audion 5, are adapted to compensate for fluctuations in the batteries C, V and B, as will hereinafter be more fully described.

Across the variable portions of the resistances $5^e$ and $6^e$ is connected the resistance $10^b$, a galvanometer $10^a$ or other suitable indicating instrument being connected at one side to one end $10^c$ of the resistance $10^b$ and at the other side to a variable contact $10^d$.

As will be seen, the battery P, in addition to battery B, energizes photoelectric cell 4. By putting the batteries V, B and C in circuit with both the audions 5 and 6 it is possible to maintain the galvanometer current through $10^a$ at a desired value.

It will be understood that when the grid is sufficiently negative with respect to the filament, a current flows therefrom through the C battery circuit to the ground G and this has been identified as the positive ion current due to the migration of the positive ions resulting from the electronic bombardment of the residual gas molecules. This current is proportional to the plate current and flowing through a resistance causes the grid sensitivity of the circuit to be increased. The factor of proportionality between the grid current and the plate current may vary with the type of tubes used or with time and to operate both tubes at the same sensitivity and to make possible the nearest approach to perfect "compensation" the two grid resistors are made variable within appropriate limits. The desired "compensation" is obtained when the product of the factor of proportionality and the value of the grid resistor are the same for both tubes in the circuit. This is accomplished by changing one or other of the resistors in value until a considerable change in the C battery voltage applied to both tubes will leave the galvanometer current unchanged. When this condition is realized the circuit may be said to be "compensated" for variations in the voltage of the battery C. As is set forth in a complete and mathematical exposition published by us (Journal of Optical Society and Review of Scientific Instruments, vol. 19, No. 6 December 1929), it may also be desirable to "compensate" the circuit for variations in the voltage of the battery B. This may be accomplished readily by combining the batteries C and B and adding a potential divider to the circuit as set forth in the publication.

Another convenient and sometimes preferable method is to use grid resistors which are only approximately the correct values to obtain compensation and to realize complete compensation by altering the filament temperature of either one or both of the audions used.

We will now describe the operation of the apparatus. With the batteries connected as shown, the two grids 5ª and 6ª will be found to have a negative bias. The grid resistors 7 and 8 are adjusted until an equal change in the potential dividers 9 and 11 produces an equal change in both plate circuits which will be ascertained when the galvanometer 10ª shows no change. By these means compensation for battery fluctuations, which is an essential requirement in the carrying out of our invention, is obtained. Better compensation may also be obtained by using combined batteries C and B with a potential divider as previously described. The variable contacts on the resistances 5ᵉ and 6ᵉ are then adjusted until the current in the galvanometer takes a desired value, generally zero.

Light 1 is then switched on whereby the interior of the Ulbricht sphere 2 is illuminated and the standard white surface 2ᵈ is placed over the aperture 2ª. The light rays reflected normally from 2ᵈ will pass through the aperture 2ᵇ, the collimator slit 3ª, and fall upon the prism within the spectrometer 3 which will form a spectrum of light near the slit 3ᵇ. The spectral color or wave length which will pass through the slit 3ᵇ is dependent upon the position of the prism which is set by the wave length drum 3ᶜ, or the prism may be fixed and an adjustable mirror provided to reflect the light toward the slit. The variable slit 3ᵇ may be adjusted in width to intercept a definite band of wave lengths and to make correction for the varying dispersion of the prism. For example, the spectrometer may be adjusted by the wave length drum 3ᶜ so that the yellow color will fall on the slit 3ᵇ and the slit is then adjusted to the width corresponding to the desired wave length band. The light passing through the slit 3ᵇ will enter the photoelectric cell 4 where it is converted into electrical energy or current which will flow through the resistance 7 whereby the potential of the grid 5ª of the audion 5 will be altered and cause a change in the plate current of the audion. The balance previously established as above described between the plate currents of the audions 5 and 6 will now be found to be upset and a current will flow through the shunt resistance 10ᵇ and galvanometer 10ª different from that in the original adjustment.

By means of the variable contact 10ᵈ on the shunt 10ᵇ or by variation in the length of the slit 3ª, or by both, the galvanometer can be adjusted to read 1.00 when the standard white surface 2ᵈ is positioned over the aperture 2ª. It will also be understood that the desired reading of the galvanometer may be obtained by changing the voltage of the battery P. When this galvanometer reading is thus obtained the sample specimen 2ᶜ which is to be tested is placed over the aperture 2ª. The galvanometer reading is then taken and generally will be found to be less than 1.00 and gives directly the percentage of white light reflected from the specimen at wave length which has been set by the spectrometer adjustment. The same procedure is followed for the other colors of the spectrum until a complete record of the sample is obtained.

Referring now to the embodiment of our invention shown in Fig. 2: A source of light 1 is mounted directly in front of the slit 3ª of the spectrometer 3 and the spectrum will be formed adjacent the slit 3ᵇ. The color or wave length entering the Ulbricht sphere 2 through the aperture 2ᵇ is determined by the positioning of the prism by the wave length drum 3ᶜ and the amount of light which may enter the Ulbricht sphere is determined by the length of the slit 3ª and the width of the slit 3ᵇ, the latter being longer than the maximum length of the slit 3ª. As in the embodiment shown in Fig. 1, the variable slit 3ᵇ is adjusted in width to intercept a definite band of wave lengths and to make correction for the varying dispersion of the prism.

The light of the definite color transmitted into the sphere 2 is uniformly diffused therein, some of the light falling on the specimen body 2ᶜ to be tested which is positioned adjacent to and opposite the aperture 2ª, and some of the light falling on the standard white surface 2ᵈ which is positioned adjacent to and opposite the aperture 2ᵉ. Apertures 2ᶠ and 2ᵍ are provided in the Ulbricht sphere 2 which are respectively diametrically opposite the apertures 2ª and 2ᵉ. Photoelectric cells 4ª and 4ᵇ are placed adjacent the apertures 2ᵍ and 2ᶠ, respectively. The reflected light from the standard white surface 2ᵈ will pass through the aperture 2ᵍ to the photoelectric cell 4ª and the reflected light from the specimen 2ᶜ will pass through the aperture 2ᶠ to the photoelectric cell 4ᵇ. One electrode of the photoelectric cell 4ª, preferably the coating, is connected to the grid 5ª of the audion 5 and one electrode of the photoelectric cell 4ᵇ, preferably the coating, is connected to the grid 6ª of audion 6. The audion amplifying circuit shown in Fig. 2 is identical with that shown in Fig. 1 which has been heretofore described and further description thereof is deemed unnecessary.

The operation of this embodiment of our invention as shown in Fig. 2 is as follows: The spectral color or wave length which will pass through the slit 3ᵇ having been determined by the setting of the wave length drum 3ᶜ, the specimen body 2ᶜ to be tested is removed from the aperture 2ª which is then unobstructed. None of the light transmitted into the Ulbricht sphere 2 will then be reflected into the photoelectric cell 4[b] but the reflected light from the standard white surface 2[d] will pass into the photoelectric cell 4[a] through the aperture 2[e]. By adjusting the width of the slit 3[b] and the length of the slit 3[a] and by means of the variable contact 10[d] on the shunt 10[b], or by changing the voltage of battery P, as described with reference to Fig. 1, the galvanometer can be adjusted to read zero, for example, and when a second standard white surface is placed over the opening 2[a], to read 1.00, for example. When this galvanometer reading is obtained the specimen body to be tested is placed over the opening 2[a] whereupon the galvanometer reading will give the ratio in percentage of white light of the light energy reflected from the specimen body at the wave length which has been set by the wave length drum 3[c]. The same procedure is followed for the other colors of the spectrum until a complete record of the sample is obtained.

In order to eliminate unavoidable differences in the photoelectric cells and audions, the placing of the specimen body to be tested and the standard white surface opposite the apertures 2[a] and 2[e] may be interchanged and the foregoing procedure repeated. One advantage of the embodiment shown in Fig. 2 arises from the fact that the standard white surface can be replaced by a standard of secondary character of nearly the same color as the specimen body to be tested and differences of a smaller order of magnitude detected.

If desired, the variations of the slits may be made automatically with the wave length drum and the color intensity curve obtained directly by a recording galvanometer as described in detail hereinafter.

Figs. 3, 4 and 5 show the preferred embodiment of the invention in a type of photoelectric spectro-photometer in which the operations are automatic and in which a very high degree of accuracy is obtained. The circuit of Fig. 1 is used. The batteries B and C may be combined and used with a potential divider as hereinbefore described. The opaque specimen S, which is to be examined, and which may be the specimen 2[c] or the standard white specimen 2[d] of Fig. 1, rests on top of a hole 12 in the upper part of the case H housing the instrument. Immediately beneath the aperture 12 is a bank of lamps 13 or any other suitable source of light, desirably provided with a diffusing reflector 14, which illuminate the lower surface of the specimen. The light reflected from this lower surface then passes through a shielding tube 15 to the spectrometer 3 hereinafter more fully described. If transmitted light or a primary source of light such as a candle flame is to be analyzed, the changes which are necessary in the above apparatus will be apparent to those skilled in the art. Throughout this specification and claims a source of light emission may refer to any or all of the following: a surface which reflects light, a transparent or translucent material transmitting light, and a device which develops light.

The light which is emitted from the light source passes into the spectrometer through a slit 16 which is preferably made variable both as to width and as to length as shown in greater detail in Fig. 5 and as will be explained hereinafter. The light then passes through a standard collimating lens 18 which collimates it on the prism 19. A pivoted mirror 20, whose angle may be varied by movement on its pivot 21, reflects the spectrum formed by the prism 19 through the lens 22. The mirror 20 can be moved to sweep the spectrum through lens 22 and out through an adjustable slit 24 to reach the photoelectric cell 4. This cell is in electrical connection with audion tubes 5 and 6 as previously described. The amplified current goes to galvanometer 10[a], the electrical connection not being shown, but being that shown in Fig. 1. The mirror 26 of this galvanometer, swung at varying angles by the electric current, then receives the light beam from the lamp 27 and reflects this against a suitable visual observation device such as ground glass and/or against a suitable photographic recording device hereinafter more fully described. The play of the light beam reflected from the galvanometer mirror is horizontal and through a slit 28 so that the energy from the light source in any given spectral region is measured by the horizontal position of the image of the lamp 27. The image of the lamp 27 thus may be projected on a sensitized film or plate 29 disposed in a plate holder 30, mounted for vertical movement adjacent the slit 28, and to which actuating cams for controlling certain other parts are secured, whereby movement of such parts may be automatically controlled in synchronism with the movement of the plate and plate holder, while the exposure of the plate to the beam during movement of the former across the fluctuating path of the latter is effective to produce a photographic curve, the coordinates of which respectively represent the wave lengths of the light being examined and the energy possessed thereby.

When measuring the comparative light energy at various parts of the spectrum we have proved mathematically that the wave length bands which are measured should be of constant width or purity. A wave length band of a width approaching zero is desirable theoretically but is not practical because of the comparatively small amount of energy which it possesses. We therefore have used a finite width of wave length band of about 10 millimicrons which gives excellent results. This width may vary as desired. For most purposes this range of light vibrations gives a sufficiently pure color or wave length band of light. To maintain this wave length band constant throughout the spectrum, it becomes necessary, for accurate results, to change the width of the slit 16, since, as the different wave length bands vary in width after dispersion, maintaining the slit 16 at constant width during changes in the angle of mirror 20 would permit wave length bands of varying width to enter the photoelectric cell 4.

Thus the width of the slit 16, which is defined by a fixed edge 33 and a movable edge 34, is changed to correspond with this varying dispersion by means of a cam 35 of suitable form, against which a movable leaf or shutter 36 carrying the edge 34 is held by a spring 38 so that rotation of the cam 35 on its pivot when in engagement with the shutter moves the edge 34 either toward or away from the fixed edge 33. The cam 35 is actuated by a link 40 secured thereto and the latter is pivoted at 41 to a horizontal rod 42, to which is secured a roller 43 engaged by a cam 45 carried by the plate holder 30, so that as the plate holder moves, a corresponding movement is transmitted to the cam 35, shutter 36 and edge 34 so as to vary the width of the slit 16. The angular disposition of the mirror 20 is also determined by the position of the plate holder through the link 46, rod 47 and cam 48 so that the mirror is caused to move in correspondence with the movements of the plate holder. The width of slit 16 is thus varied in correspondence with changes in the angle of mirror 20 so that the width of the band of dispersed light remains constant despite variations in width of the wave length bands after dispersion.

Means are also provided for varying the width of the slit 24 through which the dispersed light passes from the lens 22. Conveniently, said means generally correspond to those whereby the width of slit 16 is varied and may thus comprise a stationary edge 49, a movable edge 50 carried by a leaf 51 actuated by a cam 52 driven by a link 53 connected to the rod 42, a spring 54 being provided to hold the leaf in contact with the cam. We have determined mathematically that the slits 16 and 24 must be of substantially the same width at the various wave length bands so that the light energy reaching the photoelectric cell shall be at the maximum and by actuating in unison the movable edges defining both slits as described, we maintain the wave length band within a definite frequency range and thereby maintain the necessary light purity.

Photoelectric cells now available do not respond equally to all wave bands or color throughout the spectrum. It therefore becomes necessary to vary the light energy reaching the cell or vary the energy means somewhere in the color analyzer system to compensate for this variation in the cell sensitivity. It is necessary, otherwise, to correct all results at the various wave length bands for this varying sensitivity of the cell. We prefer to correct for this by varying the light energy admitted to the cell, the light preferably simultaneously being kept constant in purity as previously described. The energy may thus be varied by varying the length of the band of light entering the spectrometer at slit 16. For this purpose we provide a pair of suitably shaped cams 60 mounted adjacent the slit 16 on rotatable shafts 61 and so positioned as to cover all or parts of the slit depending on their angular position with respect thereto and being thus adapted through their rotation to vary the effective length of the slit whereby the energy of the light entering the spectrometer, and therefore admitted to the photoelectric cell, may be suitably controlled. If desired, similar cams may be mounted adjacent the slit 24 instead of the slit 16 with substantially the same ultimate effect upon the photoelectric cell, but in either case the cams are desirably provided with automatic means for effecting their rotation in accordance with the movement of the plate holder 30, and for this purpose we may employ, as shown in the drawings, pinions 63 carried by the shafts 61 by which the cams 60 are supported, these pinions being in engagement with racks 64 disposed at the ends of a pair of suitable actuating rods 65 which are similar to the rods employed for moving the spectrometer shutters and are actuated in like manner, that is, by cams 66 carried by the plate holder 30 and engaging rollers 67 rotatably supported on the adjacent ends of the rods 65.

The plate holder 30 is desirably arranged for vertical movement adjacent the slit 28 and may be actuated by any convenient means, such as, for example, belts 68 secured thereto and running over sheaves 69 at the top and bottom of the ways. A crank 70 controls one of the sheaves and forms a convenient means for effecting the rotation thereof and resultant movement of the plate holder.

The cams usually are so designed that the indicated response from the galvanometer due to light reflected from a $MgCO_3$ block disposed on the hole 12 and illuminated by the lamps 13, is practically constant throughout the spectrum. For convenience this constant response is taken as 1.00 so that the relative amount of light energy emitted, or indicated response from other light sources, such as colored opaque surfaces, may be read directly in percent at various wave length bands throughout the spectrum. Nevertheless cams 60 may be so designed that the indicated response may be made any desired value and need not be made constant throughout the spectrum. This is desirable for certain purposes.

Instead of varying the light energy reaching the photoelectric cell it is possible to vary the energizing voltage of the photoelectric cell supplied by battery P. This may be conveniently done by a potential divider. The voltage is varied with the angle of mirror 20 and synchronized therewith to give a suitable sensitivity to the cell as previously described. Another method of accomplishing the same result, that is, varying the energy means affecting the light energy in the system, as indicated by means of the galvanometer to produce the desired indicated response of the photoelectric cell at various wave length bands as previously described, is to vary the position of the contact $10^d$ which alters the sensitivity of the galvanometer $10^a$. These operations may all be made automatic if desired by suitable mechanism, for example, such as shown in Fig. 7. Rotation of crank 70 to change the position of the spectrometer drum effects change of the position of cam 66' which in turn results in adjustment of the potential dividing resistance PDR which may occupy the circuit position of resistances $10^b$, with its terminals Y, Z connected to contacts $5^f$, $6^f$ of resistance $5^e$, $6^e$ (Fig. 1) and with its contact $x$ corresponding to contact $10^d$ connected to a terminal of galvanometer $10^a$. This same arrangement can be used automatically to vary the anode voltage of the photo-electric cell by connecting the terminals Y, Z to the + terminal of battery P and to the − terminal of battery B, and connecting the anode of the photoelectric cell to contact $x$.

If the light beam from galvanometer $10^a$ is to be photographed as the photoelectric cell is energized by various wave length bands it is obvious that the recording of the light beam on a sensitized sheet may be synchronized with the movement of mirror 20 by means of actuating mechanism as above described. A continuous record of the light energy of the sample throughout the spectrum may thus be produced.

Thus with our apparatus and methods it is possible to first accurately analyze a sample continuously and completely throughout the spectrum and then similarly analyze a second sample, one of these usually being a standard white or any other standard. With this method our apparatus gives accurate results which may be compared, this not being possible with devices and methods heretofore used. An additional advantage obtained with our apparatus is the speed of its operation, it being possible to obtain a complete color analysis in a few seconds. This makes it possible to follow and permanently record rapidly occurring color changes, which has not been possible with the methods and apparatus of the prior art.

The general method of operating an apparatus constructed in conformity with our invention when it is desired to ascertain the relative amount of light energy at the various wave length bands emitted from a given specimen as compared to a standard white, is as follows, the ratio to the standard white being referred to as the "reflection factor" and the curve as the "reflection factor curve". The slits 16 and 24 are adjusted so that they keep a wave length band of 10 millimicrons falling on the photoelectric cell, and the cams 60 are adjusted so that the indicated response of the photoelectric cell is constant throughout the spectrum. With both the lights 13 and 27 turned on, the galvanometer is adjusted to read zero. The standard white magnesium carbonate block is then placed over hole 12 and the sensitivity of the galvanometer adjusted until the indicated response is 1, 10, 100, or any convenient unit, preferably 1.00. The actuating mechanism is adjusted so that mirror 20 is reflecting into the photoelectric cell the band of light (10 millimicrons wide) centered on the 400 millimicron wave length, and the indicated response of galvanometer 10ª through slit 28 is recorded mentally, manually, or preferably photographically. The actuating mechanism is then operated to change the angle of mirror 20 so that the wave length bands throughout the spectrum, 400 to 700 millimicrons, successively fall on the photoelectric cell, each wave length band gradually merging into the next, while slits 16 and 24 and cams 60 are simultaneously being actuated to keep the wave length band of constant purity at 10 millimicrons and also to keep the indicated photoelectric cell response constant. The indicated response results in a curve (X of Fig. 6) showing practically a 100 per cent. reflection factor throughout the spectrum. The specimen now replaces the magnesium carbonate sample on hole 12 and without making any new adjustments on the instrument the operation is repeated and another curve results.

More particularly, in the usual operation of an apparatus arranged as herein described, we maintain a standard reading of the galvanometer beam at unity throughout the preliminary examination of the standard white surface by means of suitable variations in the light energy admitted to the photoelectric cell as above described and, with the apparatus adjusted to maintain such reading for all wave lengths, we make a preliminary record of this constant response by inserting a sensitized photographic plate or film in the plate holder and moving the latter downwardly past the recording slit 28 by means of the actuating mechanism provided for this purpose, so that the beam of light reflected from the galvanometer upon the sensitized plate 29 will remain substantially stationary at 1.00 and thus produce a reflection factor curve such as the curve X shown in Fig. 6. The slight variations of this curve from the horizontal indicate slight fluctuations in the response of the apparatus which may be removed by extreme care in operation and adjustment but which are, for all practical purposes, of negligible importance in the final result and may therefore usually be disregarded.

The standard white surface is then replaced by the specimen to be examined and the plate is returned to its initial position so that the lower edge of the plate is in registry with the galvanometer beam reflected through the slit 28. The plate is then again moved downwardly and a curve Y is produced on the plate in which the readings on the axis of abscissas represent wave lengths in millimicrons and the readings on the axis of ordinates the proportion which the light energy emitted from the sample bears to that emitted from the standard white surface; thus the value of light emission from the specimen at any wave length may be directly read from the curve and in percentages when the plate is provided with the coordinate rulings.

In Fig. 6 the curve Y represents that produced by an examination of a sample of bleached wool. The unbleached wool sample was thereafter dyed carmine and upon examination then produced the curve Z.

Thus, in accordance with our invention, it is possible to successively analyze first a standard specimen, for example, a pure white magnesium carbonate (MgCO₃) surface, which serves as a standard of comparison, and thereafter to analyze the color of other specimens so that the energy of the wave length bands of the latter is expressed as ratios of the energy of corresponding bands of the standard; thus by recording the respective reflection factor curves of the specimens successively on the same photographic film or by superposing two or more developed films on which such curves have been respectively recorded, the analyses of the several specimens represented by the curves may be easily compared and even slight differences readily detected.

While in the foregoing description we have referred to a constant deviation spectrometer, it will be understood that it may be replaced by any other suitable light dispersing means such as an ordinary spectrometer or a grating spectrometer, or, where extreme accuracy is not required, a set of filters, and if a grating spectrometer is used properly the slits do not have to be adjustable in width to obtain constant purity of the wave length band admitted to the photoelectric cell.

Although we have described our invention in connection with the colors of the spectrum, it may be used for measuring the intensity of the energy of colors or radiations not in the visible spectrum, such as infra-red and ultra-violet, and thus when color and light are referred to in the specification and claims they include the invisible portions of the spectrum commonly referred to as radiations. For example, when measuring the intensity of ultra-violet radiations, a spectrometer capable of dispersing the ultra-violet light and a photoelectric cell having its maximum sensitivity in this region is employed. Like changes are made for infra-red measurements.

Photoelectric cells have various wave length sensitivity characteristics. Cells sometimes cannot be obtained which have good sensitivity over the desired range. Where it is desirable to use our photoelectric spectrophotometer over a wave length range greater than the good sensitivity range of the cell, and where it is not desirable to change the cells in the instrument as described, we have found it possible to use two or more cells in the same instrument, each cell being used in the wave length range over which its sensitivity is good.

While we have herein illustrated and described one embodiment of our apparatus with considerable particularity, we do not desire to limit ourselves thereto or to the carrying out of our method by the use of apparatus of that character alone, as it will be evident that various changes may be made in the details thereof, if desired, without departing from its principal

We claim:

1. In a device for indicating the relative amount of light energy emitted from a light source at various wave length bands, the combination of a photoelectric cell, a spectrophotometer, means for varying the amount of light energy admitted to said cell from said source to produce the desired indicated response of said cell at said various wave length bands, and means operable to maintain constant purity of the predetermined wave length band transmitted to the photoelectric cell throughout the spectrum.

2. In a device for indicating the relative amount of light energy emitted from a light source at various wave length bands, the combination of a photoelectric cell, a spectrophotometer having means adjustable to vary the wavelength of light impressed on said cell, means for varying the amount of light energy admitted to said cell from said source to produce the desired indicated response of said cell at said various wave length bands, and means for maintaining constant purity of successive wave length bands transmitted to the photoelectric cell throughout the spectrum, said last mentioned means comprising a pair of variable slits respectively at the entrance and exit of the spectrophotometer and means for effecting their adjustment in coordination with said first mentioned means.

3. In the method of indicating, by means of a photoelectric spectrophotometer, the relative amount of light energy emitted from a light source at various wave length bands, the step which comprises varying the resistance in an indicating circuit concurrently with wavelength selecting adjustment of the spectrophotometer to produce the desired indicated response of the cell at the various wave length bands.

4. In the method of indicating, by means of a photoelectric spectrophotometer, the relative amount of light energy emitted from a light source at various wave length bands, the step which comprises varying the light energy in said system to produce the desired indicated response of the cell at the various wave length bands while maintaining the wave length bands at a predetermined width.

5. In the method of indicating, by means of a photoelectric spectrophotometer, the relative amount of light energy emitted from a light source at various wave length bands, the step which comprises varying the amount of light energy admitted to the photoelectric cell to produce the desired indicated response of the cell at the various wave length bands while maintaining the wave length bands at a predetermined width.

6. In the method of indicating, by means of a photoelectric spectrophotometer, the relative amount of light energy emitted from a light source at various wave length bands, the step which comprises varying the width of the light beam entering and leaving the spectrometer to maintain the wave length bands entering the photoelectric cell at a predetermined width and constant purity, and simultaneously varying the length of the light beam entering the photoelectric cell in accordance with the response of the cell at the various wave length bands.

7. In the method of indicating, by means of a photoelectric spectrophotometer, the relative amount of light energy emitted from a light source at various wave length bands, the step which comprises varying the widths of the light beams respectively entering and leaving the spectrometer, said widths being equal to each other at all times whereby the wave length bands entering the photoelectric cell are maintained at a predetermined width, constant purity, and at maximum energy consistent with constant purity, and simultaneously varying the length of the light beam entering the photoelectric cell in accordance with the response of the cell at the various wave length bands.

8. In comparing two colors by means of a photoelectric spectrophotometer, the method which comprises transmitting to the photoelectric cell a succession of wave length bands derived from one of said colors while keeping said wave length bands at a predetermined width and constant purity and simultaneously varying energy means in said system affecting the indicated light energy to produce the desired indicated response of said cell at the various wave length bands, recording the indicated output of said photoelectric cell at the various wave length bands, and repeating said operations with the second color.

9. In comparing a color to a standard white by means of a photoelectric spectrophotometer, the method which comprises transmitting to the photoelectric cell a succession of wave length bands throughout the spectrum derived from said standard white while keeping said wave length bands at a predetermined width and constant purity and simultaneously varying the amount of light energy admitted in said bands to said photoelectric cell to thereby maintain the indicated output of said cell caused by said standard substantially constant throughout the spectrum, successively recording the indicated output of said photoelectric cell at the various wave length bands, and repeating said operations with the color to be compared.

10. In the method of indicating, by means of a photoelectric spectrophotometer, the relative amount of light energy emitted from a light source at various wave length bands, the step which comprises synchronously varying the width of the light beams respectively at the entrance and at the exit of the spectrometer as said wave length bands are transmitted to said cell, while maintaining said beams at equal width to thereby maintain the light energy transmitted to the photoelectric cell at a maximum.

11. In the method of indicating, by means of a photoelectric spectrophotometer, the relative amount of light energy emitted from a light source at various wave length bands, the step which comprises varying energy means in said system affecting the indicated light energy to produce the desired indicated response of the cell at the various wave length bands while keeping the wave length bands at a predetermined width and constant purity and maintaining the maximum light energy.

12. In a device for indicating the amount of light energy reflected from a specimen body in relation to a standard body, the combination of a light source, a spectrometer operative to effect dispersion of light derived therefrom, means for impressing the dispersed light on said bodies, a pair of photoelectric cells disposed to receive light reflected from said bodies, and means for progressively varying the wave length of the dispersed light simultaneously reflected by said bodies respectively into said cells.

13. In a device for indicating the amount of light energy reflected from a specimen body in relation to a standard body, the combination of a light source, a spectrometer operative to effect dispersion of light derived therefrom, means for impressing the dispersed light on said bodies, a pair of photoelectric cells disposed to receive light reflected from said bodies, means for varying the energy of the light admitted to the spectrometer from the source simultaneously to vary the amount of light received by said bodies, and means for progressively varying the wave length of the dispersed light simultaneously reflected by said bodies respectively into said cells.

14. In a device for indicating the amount of light energy reflected from a specimen body in relation to a standard body, the combination of a light source, a spectrometer operative to effect dispersion of light derived therefrom, means for impressing the dispersed light on said bodies, a pair of photoelectric cells disposed to receive light reflected from said bodies, means for directing dispersed light from the spectrometer onto the bodies, and means for varying the light energy simultaneously reflected by the bodies respectively onto said cells.

15. The method of determining the spectral distribution curve of light from a body, which comprises directing successive parts of the spectrum of light from said body onto a light-sensitive device to produce a direct-current whose magnitude varies in accordance with the light intensity throughout the spectrum, amplifying the current by a thermionic tube, and compensating the amplifier for fluctuations in the current supply thereof by a network including a second thermionic tube.

16. The method of comparing the colors of two bodies which comprises simultaneously directing successive parts of the spectra of light from the bodies onto light-sensitive devices to produce two series of direct currents, independently amplifying the series of direct currents, and combining the amplified currents to produce a resultant whose magnitude varies in accordance with the differences between the intensities of light from the bodies throughout their spectra.

17. A system for determining the spectral distribution curve of light from a body comprising a spectrometer, a light-sensitive device, a thermionic amplifier whose grid potential is controlled by said device, a second thermionic tube, a deflection instrument connected between the anode circuits of said tube to measure the light from said body, and a resistance in the grid circuits of said tubes, at least one of which is adjustable in order that the product of the grid circuit resistance and the factor of proportionality between the positive ion grid current and the plate current of one tube may be made substantially equal to the product of the grid circuit resistance and proportionality factor of the other tube.

18. A system for comparing the colors of two bodies comprising a spectrophotometer, means associated therewith for transmitting simultaneously to both bodies light of the same wavelength throughout a range of wavelengths, a pair of light-sensitive devices, each receiving light from one of said bodies, a pair of thermionic amplifiers, the grid potential of each of which is controlled by one of said devices, and a deflection instrument connected between points in the anode circuits of said tubes whose potentials are and remain the same when one of said devices is not exposed to light, and whose potentials, when both of said devices are exposed to light, differ substantially proportionally to the difference between the intensities of light from said bodies throughout said range of wavelengths.

19. Apparatus for determining the color distribution curve of a light source comprising a photoelectric cell, selective means interposed between said source and said cell for causing the wavelengths of the spectrum from said source to be impressed upon said cell in successive bands, and means operated simultaneously with said selective means for varying the width of one or more slits in the light path between said source and said cell to maintain constant the width of the band of wavelengths throughout said spectrum, and concurrently for varying the length of one or more slits in said path to compensate for the wavelength-sensitivity characteristic of said cell.

20. A system for indicating the relative amount of light energy emitted from a light source at various wavelength bands comprising a photoelectric cell, a spectrophotometer having means adjustable to select the wavelength band impressed on said cell, means adjustable to vary the response of said cell, and means coupling said two adjustable means to effect predetermined adjustment of said second adjustable means as said band selecting means is adjusted from selection of one band to selection of another band.

21. A system for indicating the relative amount of light energy emitted from a light source at various wavelength bands comprising a photoelectric cell, a spectrophotometer having means adjustable to select the wavelength band impressed on said cell, means adjustable to vary the amount of light energy admitted to said cell, and means coupling said two adjustable means to effect predetermined adjustment of said light varying means as said band selecting means is adjusted from selection of one band to selection of another band.

22. A system for indicating the relative amount of light energy emitted from a light source at various wavelength bands comprising a photoelectric cell, a spectrophotometer having means adjustable to select the wavelength band impressed on said cell, means adjustable to vary the electrical pressure energizing said cell, and means coupling said two adjustable means to effect predetermined adjustment of said electrical-pressure varying means as said band selecting means is adjusted from selection of one band to selection of another band.

23. A system for indicating the relative amount of light energy emitted from a light source at various wavelength bands comprising a photoelectric cell, a spectrophotometer having means adjustable to select the wavelength band impressed on said cell, a circuit including an indicating galvanometer, means adjustable to vary the resistance of said galvanometer circuit, and means coupling said two adjustable means to effect predetermined variation of the resistance of the galvanometer circuit as said band selecting means is adjusted from selection of one band to selection of another band.

24. A system for indicating the relative amount of light energy emitted from a light source at various wavelength bands comprising a photoelectric cell, a spectrophotometer having means adjustable to select the wavelength band impressed on said cell, a shutter adjustable to vary the amount of light energy admitted to the cell, and means coupling said shutter to said band selecting means to effect movement thereof from one predetermined position to another predetermined position as said band selecting means is adjusted from selection of one band to selection of another band.

25. A system for indicating the relative amount of light energy emitted from a light source at various wavelength bands, the combination of a photoelectric cell, a spectrophotometer having means adjustable to select the wavelength band impressed on said cell, means adjustable to vary the response of said cell, means coupling said two adjustable means to effect predetermined adjustment of said second adjustable means as said band selecting means is adjusted from selection of one band to selection of another band, means adjustable to control the purity or band width, and means coupling said last-named means to said band selecting means to maintain constant purity for the various bands.

26. A system for indicating the relative amount of light energy emitted from a light source at various wavelength bands, the combination of a photoelectric cell, a spectrophotometer having means adjustable to select the wavelength band impressed on said cell, means adjustable to vary the response of said cell, means coupling said two adjustable means to effect predetermined adjustment of said second adjustable means as said band selecting means is adjusted from selection of one band to selection of another band, adjustable slits at the front and rear of said spectrophotometer, and means for varying the widths of said slits concurrently with adjustment of said band selecting means to maintain constant purity for the various bands.

27. A device of the character described comprising a photoelectric cell, a spectrophotometer having means adjustable to select the band of wavelengths of light energy impressed on said cell, means adjustable to vary the response of said cell, and means coupling said two adjustable means to effect predetermined adjustment of said second adjustable means as said band selecting means is adjusted from selection of one band to selection of another band thereby to compensate for varying sensitivity of the cell at various wavelength bands.

JOSEPH RAZEK.
PETER J. MULDER.